United States Patent [19]

Sample

[11] 4,397,332

[45] Aug. 9, 1983

[54] STANDPIPE CAP LOCKING MEANS

[76] Inventor: Louis J. Sample, 42-49 Colden St., No. 7P, Flushing, N.Y.

[21] Appl. No.: 277,967

[22] Filed: Jun. 26, 1981

[51] Int. Cl.³ .............................................. F16K 35/02
[52] U.S. Cl. ..................................... 137/385; 137/800; 251/90; 70/177; 70/212; 220/315; 138/89
[58] Field of Search ............... 137/382, 383, 385, 800; 251/90; 70/164, 177, 178, 170, 211, 212; 220/314, 315; 138/89

[56] References Cited

U.S. PATENT DOCUMENTS

| | | | |
|---|---|---|---|
| 1,814,343 | 7/1931 | Smith | 70/164 |
| 3,048,189 | 8/1962 | Chandler | 251/90 |
| 3,623,498 | 11/1971 | Manahan | 137/382 X |
| 3,722,549 | 3/1973 | Wilson et al. | 138/89 |
| 3,930,389 | 1/1976 | Buikus | 138/89 X |
| 3,949,787 | 4/1976 | Milo | 138/89 |
| 3,980,099 | 9/1976 | Youngblood | 137/382 |
| 4,289,163 | 9/1981 | Pierson | 137/587 |

*Primary Examiner*—Martin P. Schwadron
*Assistant Examiner*—Sheri M. Novack
*Attorney, Agent, or Firm*—McAulay, Fields, Fisher, Goldstein & Nissen

[57] ABSTRACT

Unauthorized removal of the cap from a standpipe, such as a fire line standpipe, is prevented through use of a bent metal bar and a nipple formed at the center of the standpipe cap. The bar has an opening to accept the nipple extending from the standpipe cap, and a slot to receive a metal pin which prevents movement of the standpipe cap, rotation of the cap being prevented by additional means formed on the cap and bar. The bar can be so formed as to also prevent unauthorized removal of the handwheel of the valve which permits liquid flow through the standpipe opening.

12 Claims, 5 Drawing Figures

U.S. Patent   Aug. 9, 1983   4,397,332

STANDPIPE CAP LOCKING MEANS

BACKGROUND OF THE INVENTION

Standpipes are common for fire fighting purposes, particularly in commercial and mass occupancy buildings. A variety of connections are provided on standpipes to allow for attachment of fire hoses in case fighting of a fire in such a high occupancy building becomes necessary.

Until recent years, the standpipe connections have not presented a problem. However, increasingly, in recent years, these connections have been subject to increasing incidents of vandalism. The cap covering the standpipe can be removed, and the valve opened, so that there is an excessive water flow, without need, not only rendering use of the given standpipe opening difficult, but substantially reducing the pressure in the remainder of a system of which the standpipe forms a part. Without water flow, the standpipe cap may be removed and the opening clogged by various kinds of debris. Again, without water flow, the hand wheel or handle provided on the valve stem may be removed, so that when the standpipe and its opening become necessary in fighting a fire, the proper implements are not available for opening the valve which allows use of the standpipe opening.

As these increasing incidents of vandalism have become more apparent, various means have been devised and provided to avoid them. None have been fully successful.

Many of the prior art systems, while providing means for locking an unauthorized opening of a standpipe or similar arrangement, have required exceedingly sophisticated tools to actuate the device. Others, less sophisticated, have not provided for proper protection of the device from unauthorized opening.

Among the prior art devices disclosed are those in U.S. Pat. No. 3,623,498 Manahan, issued Nov. 30, 1971. That patent describes an apparatus to seal the valve stem, rather than the outlet, of a fire hydrant. The dome at the top of the hydrant, according to that patent, is provided with a slot into which an arm fits. The arm is provided, at the lower part, with legs having openings. A clamp means is provided which seats against the bottom of the hooded dome and has an upstanding leg with an opening. The two parts are placed in the slot and assembled and a pin is driven through the four aligned openings. This pin is then peened over, and can only be removed by cutting. This does not provide the same protection as provided by the present invention.

In Wilson et al, U.S. Pat. No. 3,722,549, a cap to be placed on a pipe for an underground storage tank is described. The cap is so formed to prevent accidental removal and prevent unauthorized removal. It includes a circular cap which has arms pivoted to it, the arms, in turn, being pivoted to other members. The other members are pivoted to a central post which, when it is pushed down, causes the arms to move inwardly to lock against the pipe. To prevent unauthorized removal, a member having an opening extends up from the cap and seats between the arms of a further member having aligned openings. Any type of locking mechanism, according to that patent, is placed through these holes. However, this device does not provide the simplicity of construction and operation realized in accordance with the present invention.

In Milo, U.S. Pat. No. 3,949,787, a pipe cap to be placed on the adaptor of the standpipe is described. A U-shaped handle, having lugs, is mounted to the adaptor which also contains a locking tab. The cap has cammed surfaces over which the lugs lock to hold the cap in place. A hole is placed in one of the side arms of the U-shaped handle, the hole aligning with the locking tab when the cap is in place, allowing a locking means, such as the hasp of a lock, to be placed in position.

None of the structures and schemes of the prior art have completely solved the vandalism problem associated with such standpipe outlets in such a way as to protect them from vandalism, while also providing a facile means of opening the cap.

BRIEF DESCRIPTION OF THE INVENTION

In accordance with the present invention, a standard tap is provided from a standpipe for attachment of a fire hose. This attachment may be in the form of a valve body having a side opening, and an end stem. A standard cap is provided on this side opening. To prevent unauthorized removal of the cap, as by vandals, means are provided in accordance with the present invention. Those means prevent the unauthorized removal of the cap, while permitting, with, essentially, standard tools, the easy removal of the cap when authorized utilization of the valve is required. Additionally, the means to prevent unauthorized removal of the cap may also prevent the unauthorized or malicious removal of the handwheel for the valve, another frequent act of vandals.

DESCRIPTION OF THE PREFERRED EMBODIMENTS

Figure 1:
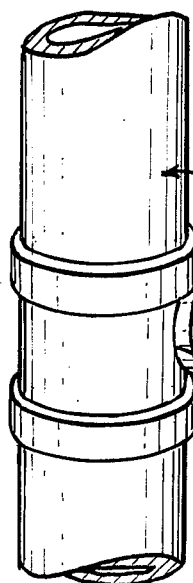
FIG. 1 is an environmental view, in perspective, showing the standpipe, attached valve, and means for preventing removal of the cap and valve handwheel.

In accordance with the present invention, a standpipe 1, providing for ready availability of water under pressure to fight fires, is provided in a standard commercial structure, such as a commercial building or apartment. At preselected points along the standpipe, a T-connection 2 is made. Attached to the T-connection is a valve 3, the valve having a side outlet, indicated generally at 4, and an end extending stem (not shown) within the portion 5.

The side connection 4 is provided with a threaded section 6. A cap 7 is threadedly attached to the side portion 4 so as to seal the connection when it is not in use.

The portion 5 containing the stem is provided, at its end, with a handwheel 8 to allow for the opening of the valve and the passage of water from the standpipe 1, through the tee 2 and valve body 3, and out through the portion 4, when the standpipe cap 7 is removed and the handwheel 8 provides for opening of the valve. Generally, as indicated in the figures, the handwheel 8 is held to the stem by a nut 9.

Both the standpipe cap 7 and nut 9 are frequent targets of vandalism. As previously indicated, the object of the present invention is to prevent the unauthorized removal of the standpipe cap 7 and, as desired, the nut 9. Removal of the nut 9, obviously, would also allow for removal of the handwheel 8, so that the handwheel would not be available, when desired, for operation of the valve 3.

To prevent the unauthorized removal of the standpipe cap, the device of the present invention is employed. This device acts in conjunction with the standpipe cap 7, locking it into position, and preventing its rotation or removal. Specifically, the device includes a bent metal bar 10 which includes sections 11, 12, and 13. Extending from the section 11 of the bar 10 is a nipple 14.

The section 11 is also provided with a slotted opening 15. The face 16 of the cap 7 is provided with a headed pin 17. The pin is slideably mounted within the opening 15, the head 18 preventing removal of the metal bar 10.

The skirt 20 of the cap 7 is obviously circular. At some point on the skirt 20, a teat 21 is affixed. The length of the teat 21 is sufficient, so that upon rotation of the cap 7, the teat abuts against nipple 14, preventing further rotation of cap 7.

The section 11 of the bar 10 is also provided with a pair of aligned, transverse slots which are continuous, in each case, from an outer edge of the section 11 to a surface of the slot 15.

Figure 2:
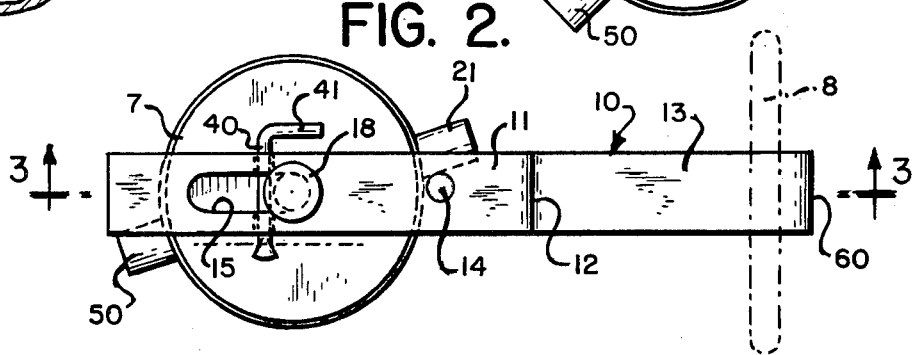
FIG. 2 is a plan view showing the standpipe cap and handwheel with the removal prevention device of the present invention in place.
Figure 3:
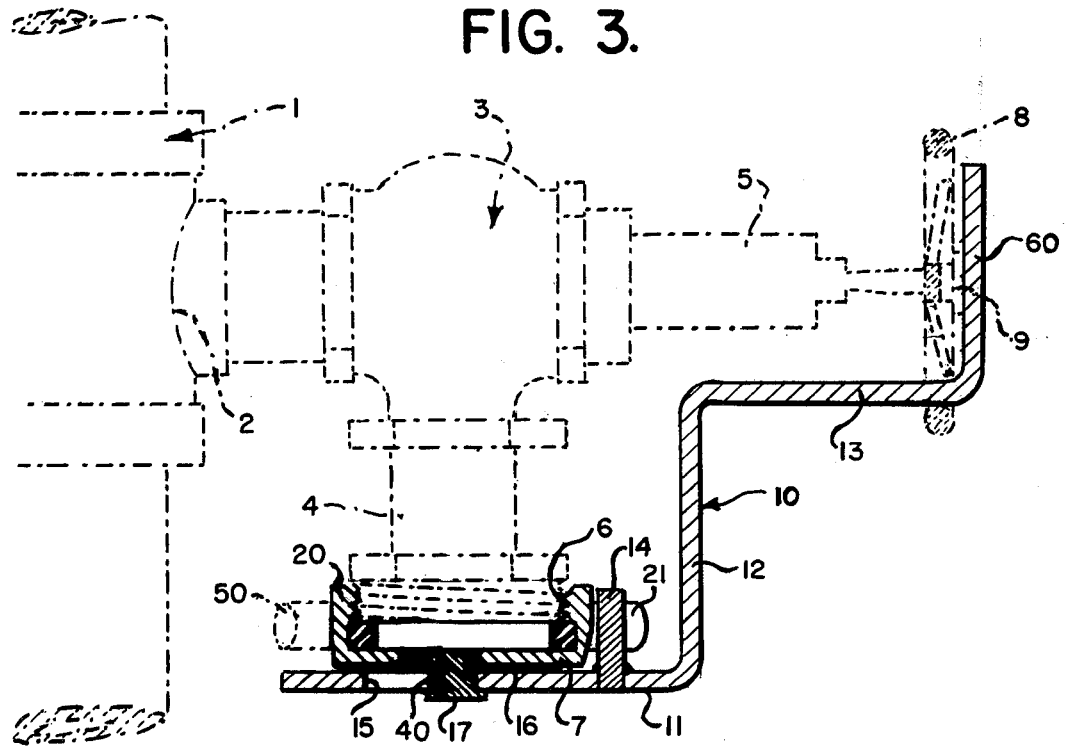
FIG. 3 is a side view, partially in phantom and partially in section, along the line 3—3 of FIG. 2.

When the standpipe cap is to be locked, the metal bar 10 is moved as far to the left, as viewed in FIG. 2, as the pin 17 will permit. In this position, a pin 40 is inserted through slots 30 and 31. The slots are so placed that the pin abuts the main portion of the pin 17, under the head 18. With the pin 40 in place, the metal bar 10 cannot be moved to the right, because of the abutment of pin 17 against pin 40, and cannot be moved further to the left, because it is at the righthand extremity of the slot 15. The section 13 of the bar 10 is sufficiently long that it lies within an opening in handwheel 8. This prevents turning of the metal bar 10 if an attempt is made to rotate the cap 7, and prevents turning of handwheel 8.

Any attempt to rotate the cap 7 as in a counterclockwise direction as viewed in FIG. 2, in order to remove it from the valve, results in the abutment of teat 21 against nipple 14. Because of this abutment, and because rotation of bar 10 is prevented, the standpipe cap cannot be removed from the valve, so that no flow of water is permitted.

To prevent removal of pin 40 from slots 30 and 31, the end is bent over, as shown at 41 in FIG. 2. Instead of bending pin 40 over, the end can, obviously, be peened to prevent removal. Further, the pin 40 may actually be one side of the hasp of a lock, the size of the hasp and the size of the slots 30 and 31 being so selected as to provided for insertion of the hasp.

Figure 4:
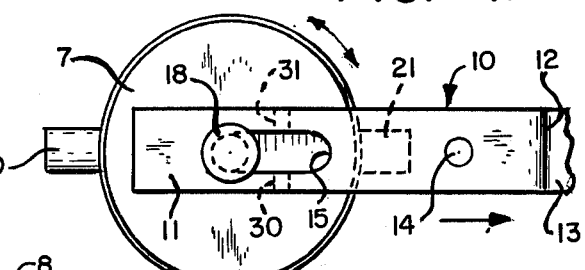
FIG. 4 is a plan view similar to FIG. 2, showing the removal prevention device of the present invention translated, to allow removal of the standpipe cap.
Figure 5:
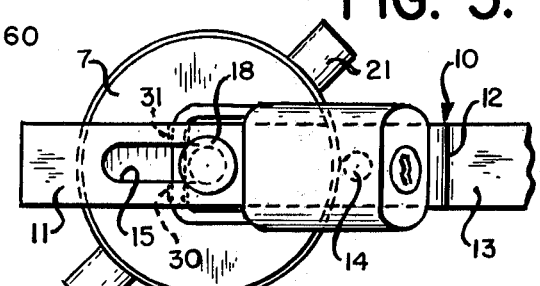
FIG. 5 is a view similar to FIG. 4 showing partial removal of the standpipe cap.

To allow for removal of the cap 7 from the valve 3, the pin 40, or hasp of the lock if that is employed in place of the pin 40, is removed from the slots 30 and 31. This can easily be accomplished with a bolt cutter or, in the case of a lock, obviously, with the proper key. When the pin 40 or lock hasp is removed from the slots 30 and 31, the metal bar 10 may easily be moved to the right as illustrated in FIG. 4, and in this position, nipple 14 is moved away from teat 21 sufficiently to allow turning of cap 7 and its ultimate removal from the threaded portion 6 of valve 3. The entire assembly, bar and standpipe cap, can then be removed from the unit and the proper hose attached to the threaded section 6.

If desired, to allow for, at the most, 180 degrees rotation of the standpipe cap 7 in the locked position, a second teat 50, can be provided on the skirt 20, diametrically opposed to the first teat 21. No additional nipple 14 is nessary, either of the teats, 21 and 50, abutting against the same nipple 14, when an attempt is made to remove the standpipe cap 7 by rotation.

The structure in accordance with the present invention had thus far been described with regard to prevention of removal of the standpipe cap 7. However, as previously indicated, another area of vandalism is the unauthorized removal of the handwheel 8, after removal of the nut 9. This unauthorized removal can also be prevented by extension of the metal bar 10 to a further section 60. The section 60 is, essentially, perpendicular, to the section 13, though generally parallel to the section 12. The section 60 overlies nut 9, when the bar 10 is moved leftward as indicated in FIG. 2 to the locking position. Thus, in the locking position, when bar 10 has a section 60, not only is the removal of the standpipe 7 prevented, but removal of the handwheel 8, by removal of its holding nut, is also prevented.

While the bar 10 has been illustrated as having at least three sections, 11, 12, and 13, 12 being generally perpendicular to 11, and 13 being generally perpendicular to 12 and generally parallel to 11, it should also be appreciated that the bar 10 can be provided as one straight bar. If that is the structure, then the handwheel 8 must be sufficiently large that the bar 10 extends through it in the position in which it locks the the cap 7 in place, or other means must be provided for preventing rotation of the bar 10. With a straight bar 10, when a section 60 is added, obviously, it is made generally perpendicular to the straight section so as to overlie nut 9 and handwheel 8.

While specific embodiments of the present invention have been shown and described, the invention should not be considered as limited to this description, but only as limited by the appended claims:

I claim:

1. In a system for controlling the flow of a fluid, said system including an outlet port for said fluid and a valve to control the flow to said outlet port, said outlet port being covered by a threaded cap, said cap having a face portion and a depending skirt, the improvement which comprises means for preventing unauthorized removal of said cap including:
   a. a headed pin mounted, essentially, in the center of said face portion of said cap;
   b. a slotted bar overlying said cap, said headed pin lying within the slot in said bar, the head of said pin preventing removal of said bar from said cap;
   c. transverse slots formed in said bar, one transverse slot lying on each side of the headed pin slot in said bar, said transverse slots being aligned and so positioned that when said bar is moved to one extremity relative to said headed pin, said headed pin abutting an end of the slot in said bar, the transverse slots are aligned diametrically opposite the part of said pin adjoining the end of said slot;
   d. means extending from said bar, essentially parallel with said skirt of the said cap;

e. at least one extension formed on said skirt to abut said means extending from said bar when said bar is in an extreme position relative to said pin;

f. means to prevent rotation of said bar; and g. means for insertion through the transverse slots formed in said bar to abut the part of said pin diametrically opposite the part of said pin adjoining the end of said slot, so as to prevent movement of said bar.

2. The removal preventing apparatus of claim 1, wherein said means extending from the skirt of said cap for interaction with said depending means is a teat.

3. The apparatus of claim 2, wherein two teats are providing extending from said skirt, one diametrically opposed to the other.

4. The apparatus of claim 1, wherein said bar has three sections including a first section having said slot and said aligned transverse slots, a second section perpendicular to said first section, and a third section, generally perpendicular to said second section and generally parallel to said first section.

5. The apparatus of claim 4 wherein said valve is provided with a handwheel for operation of said valve, the third section of said bar passing through an opening in said handwheel for said valve.

6. The apparatus of claim 5, wherein said bar has an additional section, generally perpendicular to said section having said slot and said aligned transverse slots, said additional section being generally perpendicular to said section having said slot and said transverse slots, said additional section overlying the central portion of said handwheel for said valve, to prevent unauthorized removal of said handwheel.

7. The apparatus of claim 1, wherein operation of said valve is controlled by a handwheel.

8. The apparatus of claim 7, wherein said means for preventing rotation of said bar is an opening in said handwheel through which said bar passes.

9. The apparatus of claim 1, wherein the means inserted through said aligned transverse slots is a pin.

10. The apparatus of claim 9, wherein the end of said pin is bent over after insertion.

11. The apparatus of claim 9, wherein the end of said pin is peened after insertion.

12. The apparatus of claim 9, wherein said pin is a portion of the hasp of a lock.

* * * * *